June 3, 1941.                A. G. SIEFKER                2,244,125
                        MULTIPLE VELOCITY INDICATOR
                Filed Feb. 8, 1940            2 Sheets-Sheet 1
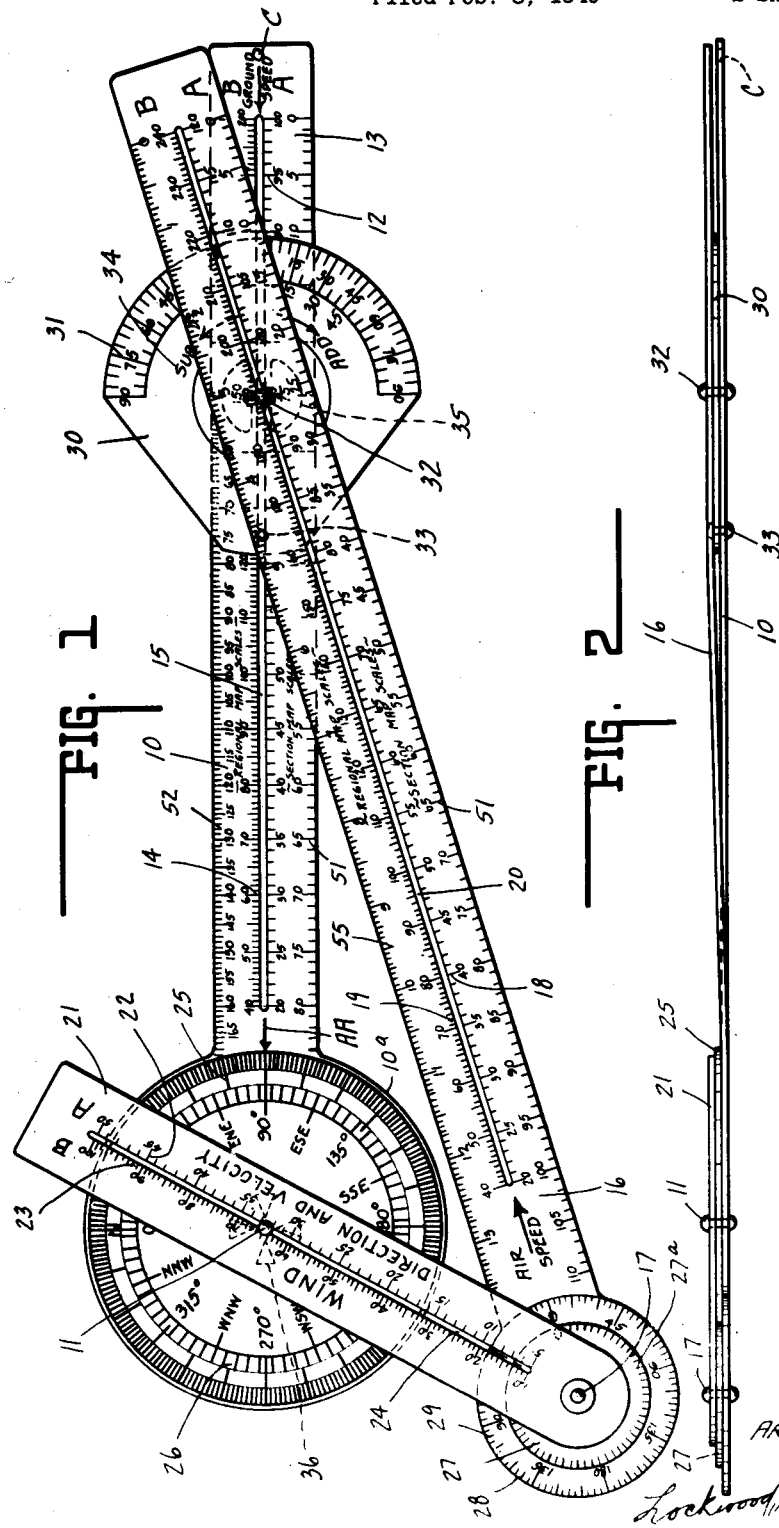
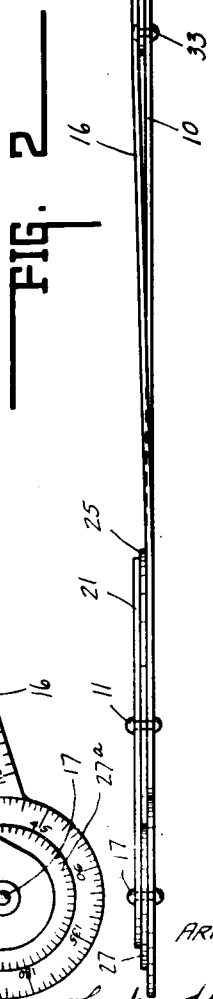
INVENTOR.
ARNO G. SIEFKER.
Lockwood Goldsmith Galt
ATTORNEYS June 3, 1941.  A. G. SIEFKER  2,244,125
MULTIPLE VELOCITY INDICATOR
Filed Feb. 8, 1940  2 Sheets-Sheet 2
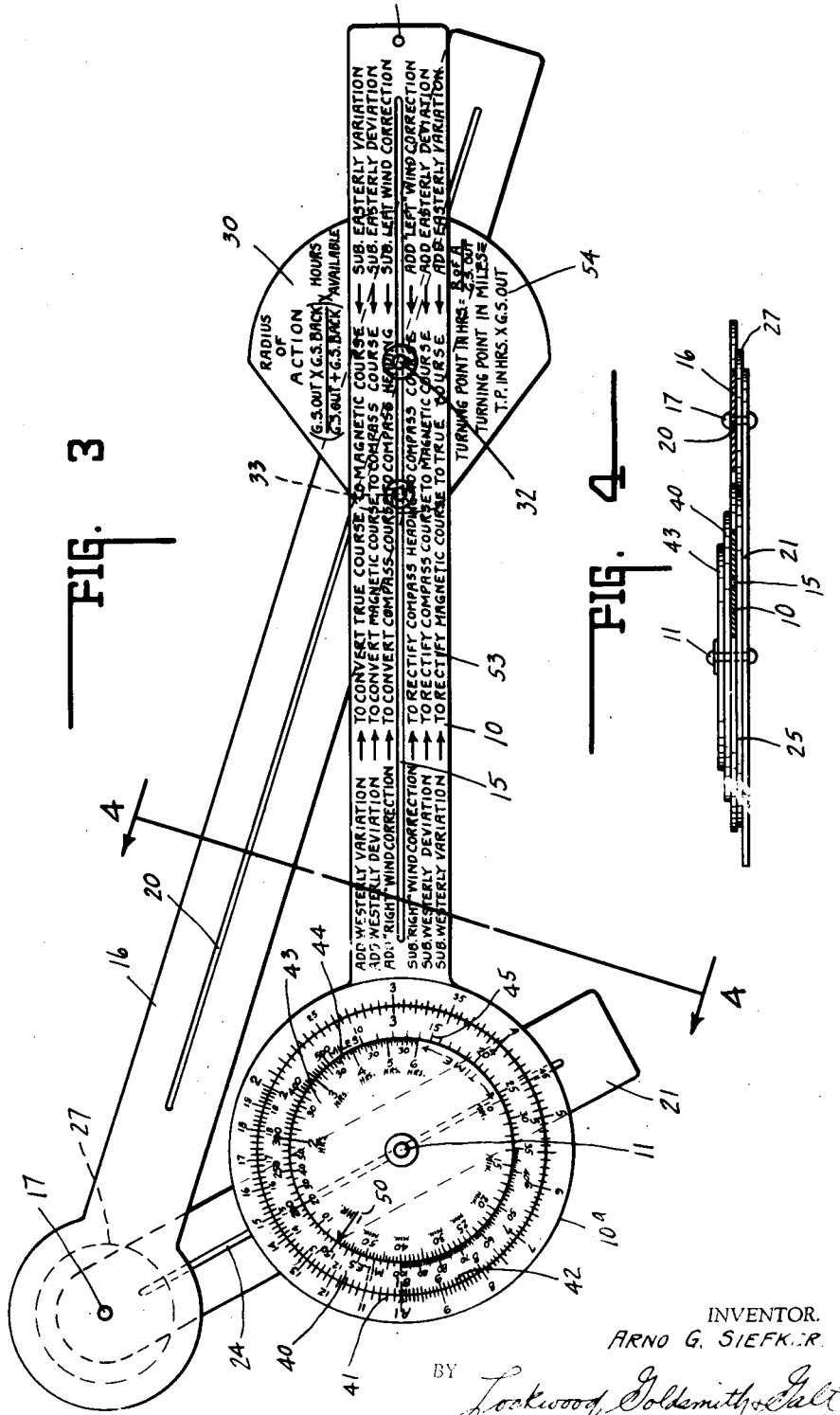
INVENTOR.
ARNO G. SIEFKER
BY
Lockwood, Goldsmith & Galt
ATTORNEYS.

Patented June 3, 1941

2,244,125

UNITED STATES PATENT OFFICE 2,244,125

MULTIPLE VELOCITY INDICATOR

Arno G. Siefker, Indianapolis, Ind.

Application February 8, 1940, Serial No. 317,815

12 Claims. (Cl. 33—98)

This invention relates to an instrument particularly useful in aviation although capable of other uses.

The chief object of this invention is to provide an instrument, especially useful for aviators for speed and directional guidance by which having given two components, the third may be readily and visually ascertained, which components are wind velocity and direction, air speed, and ground speed.

Other objects of this invention are to provide such an instrument with suitable accessories and scales whereby an all-purpose device is available, as hereinafter pointed out more fully.

The chief feature of the invention consists in providing a wind scale, an air speed scale and a ground speed scale, certain of the same having a volumetric and angular adjustable connection, certain of the same having a pivotal connection, and certain of the same having an adjustable association.

A further feature of the invention includes the addition of a drift angle scale operatively associated with the aforesaid scales for drift correction reading and application.

Other features of the invention provide for use of the device as a transit, logarithmic slide rule, ruler, map scale, et cetera, all as pointed out hereinafter.

By the term "sequentially connected" referred to herein and the accompanying claims, is intended to include three or more elements connected first to the second, second to the third, et cetera.

By the term "closed connection" similarly it is intended to include the aforesaid but in this instance the last element of the sequence is connected to first element thereof to define an enclosed polygonal area, herein a triangle.

The term "longitudinal axis of an elongated member" is defined by the longitudinal central plane of said member through pivotal axis thereof.

The full nature of the invention will be understood from the accompanying drawings and the following description and claims:

In the drawings, Fig. 1 is a top plan view of the invention.

Fig. 2 is a side elevation of the same.

Fig. 3 is a bottom plan view of a modified form of the invention.

Fig. 4 is a transverse, sectional view taken on line 4—4 of Fig. 3 and in the direction of the arrows.

In the form of the invention illustrated in Figs. 1 and 2, there is disclosed a multi-purpose instrument. The numeral 10 indicates an elongated member which has a "zero" point 11 in the form of a headed pin, and a scale arrangement or designation 12 on its face 13 reading from 20 to 100 miles per hour. Another scale 14 thereon reads from 40 to 200 miles per hour. A third scale may be provided which may be a multiple thereof, or the aviator may carry that multiple in mind, as hereinafter pointed out. Herein member 10 includes an elongated slot 15 therein coextensive with the working portion of the scale, or scales.

A similar elongated member 16 includes a zero point 17 and scales 18 and 19 arranged for miles per hour, air speed designations, the unit length of miles per hour of scales 18 and 19 being the same as for scales 12 and 14, respectively. Member 16 includes slot 20 co-extensive with the working portion of the scale, or scales, last mentioned.

A third and similar member 21 is pivotally connected to one of said elongated members at the zero point thereof and has an adjustable connection with the other zero point of the other of said elongated members. Member 21 is the wind scale member and is provided with two scales 22 and 23 corresponding to scales 12 and 18, and 14 and 19, respectively. An elongated slot 24 in member 21 is coextensive with the working portion of the scale, or scales.

If the air speed of the plane is in the 20 to 100 miles per hour range, all low speed scales corresponding thereto are utilized. If the air speed of the plane exceeds 100 miles per hour but is below 200 miles per hour, all the high speed scales are utilized. If the air speed of the plane exceeds 200 miles per hour, the third mentioned multiple scales, not shown, may be employed, if provided. If not provided, either high or low speed scales may be utilized, proper reduction being made, it being obvious that any desired linear unit scale of length may represent any number of miles per hour, so long as that selected unit is utilized with respect to all members.

For example, if the plane air speed is 300 miles per hour, the low speed scales would be utilized and all legends on the low speed scale then read one-third of the actual speeds. If the plane air speed is below 400 miles per hour, the high speed scales then read one-half of the actual speeds on those scales.

In the first mentioned example, a "low" scale reading of 80 would be read as 240 miles per hour. In the second example, a high scale reading of 80 would be read as 160 miles per hour.

Herein the wind scale 21 is pivoted at the zero point 17 of the air speed scale and zero point 11 has sliding connection in slot 24. A pin 32 has sliding connection in slots 15 and 20 although, if desired, such connection in the sequentially connected but not closed connected type may be omitted. The closed connected type is preferred and hence, the wind scale 21 overlies the ground scale 10 and compass 25. The air speed scale 16 overlies the ground speed scale 10. The wind scale 21 may underlie the air speed scale so that minimum wind velocities can be set whenever desired. However, herein the reverse arrangement is illustrated.

Associated with the zero point 11 is a disc 25 with a compass arrangement 26 thereon. Associated with pivot 17, if desired, is the disc 27 having angular scale 27a thereon, serving as a vernier when used with angle scale 29 on the circular enlargement 28 of member 16. The intersection of slot 24 with scale 29 can be read directly as the angle of wind direction relative to the longitudinal axis of the plane and very accurately by means of the vernier arrangement.

Another and wind correction scale member 30 has an arcuate scale 31 in degrees, the center of which coincides with the headed pin 32 which rides in slots 15 and 20. Another pin 33 rides in slot 15. Member 30 can and does slide longitudinally relative to member 10 as member 16 is adjusted relative to member 10. This intersection of slot 20 with scale 31 gives the wind correction angle in degrees and the scale positively designates whether that correction is of plus or negative value, see legending 34. Member 30 is apertured at 35 to facilitate ground speed scale reading.

To facilitate use by application upon a map, at zero point 11 the compass disc 25 is similarly apertured at 36 and enlargement 10a may be similarly apertured. Wind scale member 21 preferably is transparent. These apertures facilitate map use when a straight line is drawn through the destination and starting points.

To illustrate the usefulness of the invention, the following is given.

Assume it is contemplated flying from Indianapolis, Indiana, to Dayton, Ohio and that the wind at Indianapolis is blowing with a velocity of 32½ miles per hour from near the north by northeast. This information is obtained from the starting point airport and is available to all pilots. This wind direction, therefore, is 28° from the true north and toward the east. If it is assumed the plane will travel at an air speed of 95 miles per hour, this being the most economical or cruising speed of the plane or the same being read from an airspeed indicator which is standard equipment on all planes at the present time, the answers required are—what is the ground speed in miles per hour and what is the correction angle for drift in degrees and shall it be added or subtracted?

To use the instrument, the arrow head designated by AA on the ground speed scale is set to 90° on the compass disc, since Dayton and Indianapolis are substantially the same latitude and, therefore, true north is at 90° to line of travel. The free end of the wind scale on the compass disc thus located is set so that the slot thereof registers with 28°, the direction of the wind. Then the scale is slid until the zero point 11 registers with the graduation mark 32½, being the miles per hour wind velocity. This then definitely locates the center 17 of the wind scale. These positions are held.

If the device is of the sequentially but not closed connected type, the air speed scale is rotated about the axis 17 until the slot 20 intersects the slot 15 so that the legend 95 of the corresponding air speed scale intersects the slot 15. The reading on the ground speed corresponding scale, in this instance 75, gives the ground speed in miles per hour.

When the instrument is of the sequentially and closed connected type, the operation is identical. When the wind correction angle factor is employed, this member 30 is slid longitudinally along the slot 15 in the proper direction for air speed slot 20 intersection with the slot 15. Thus, the member 30 facilitates the movement of the air speed scale and when thus provided, the instrument through the slot 20 will read at the intersection of said slot 20 with the scale 31, the wind correction angle. This reading with the example set forth and as shown in the drawings, is 18°. By referring to the legending 34, it will be noted this angle is to be subtracted and not added.

The caution to be observed in the foregoing is that if any reading in miles per hour is associated with one scale, the corresponding scales on the other slotted members must be employed. In the foregoing example, reference has been had only to the low speed scales.

As a second example, assume that a trip from Indianapolis, Indiana, to Chicago, Illinois, is contemplated and the Indianapolis airport advises the wind is blowing with a velocity of 30 miles per hour from the east, or 90°. The air speed indicator shows the plane is travelling at 100 miles per hour air speed. The answers required are—what is the ground speed in miles per hour, what is the correction angle for drift in degrees and shall it be added or subtracted? The arrow head on the ground speed scale is set to 331°. The The free end of the wind scale is set to read to the east or 90°. Then the wind scale with that setting is adjusted until the velocity of 30 miles coincides with the zero point 11. The drift angle disc then is slid in the slot 15 until the air speed scale mark 100 registers with the pin 32 and the ground speed scale reading at that intersection is 112 miles per hour, which is the ground speed of the plane. The drift angle correction thereupon is read on the scale 31. This is 15½°, and it will be noted when this set up is accomplished that the intersection is on the additive side of the scale, showing the wind is assisting the plane towards its destination and not opposing it.

In like manner, other examples may be set forth to illustrate the operation of the invention but it is believed these two are sufficient for the foregoing illustration of the graphical ascertaining of the ground speed in miles per hour and the ascertaining of the drift correction angle in degrees and whether the same is to be added or subtracted so that the pilot may properly guide the plane.

When it is desired to find the "true course" from the point of departure to the point of destination and a map is available, the pilot draws a line on the map through these two points. At the intersection of this line with the meridian nearest the middle, the center of the compass disc is set. Then the ground speed scale is arranged so that the slot 15 coincides or covers the true course line drawn on the map. The compass disc then is set to the true north and the true course is ascertained therefrom by the intersection of the arrow AA on the ground speed scale with the compass.

When it is desired to find the drift angle, the ground speed scale slot 15 is set parallel to the longitudinal axis of the plane and the air speed scale is moved until the object on the ground appears to move parallel to the slot 20. The drift angle then is read directly on scale 31 of the sliding disc 30 and this also will indicate whether the correction should be added or subtracted.

Whenever it is desired to find the direction and velocity of the wind after determining the drift angle, the air speed scale is moved until the graduation corresponding to the miles per hour of the plane coincides with the zero point 32, keeping the predetermined drift angle setting fixed. Then the wind velocity can be read directly on the scale of the wind member 21 where the zero point 11 intersects the scale of the wind member. The wind direction angle then is ascertained by observing where the slot 24 in the wind member 21 intersects the compass scale after the latter has been set to the true north or straight up, as shown in Fig. 1.

It will be obvious to those skilled in this art that when the instrument instead of being worked in the horizontal plane is worked in the vertical plane, the instrument may be utilized for bomb sighting purposes.

For the simplest form of the invention, it will be obvious that the material of which the various members may be constructed is anything which has the desired strength and rigidity and the same may be transparent, white or any suitable color. Thus, the material may be Celluloid, aluminum, brass, copper, steel, non-breakable glass, fibre or a phenol condensate. Preferably, the material for wind and air speed scales is transparent Celluloid or better still sheet acetate material which is relatively non-inflammable.

The invention may be mounted on the instrument board in the plane or be hung upon a hook therein. It also may be mounted on a transparent or semi-translucent lid of a box-like container having a light therein for night observation and calculation purposes. Conventional methods of support when not in use, are the various forms. In the closed connected type, the instrument may be hung on a nail or hook in the plane or can be carried in the pocket.

If desired, anyone of the aforesaid connections may be of tubular character so as to receive a nail, screw or pin, which would support the instrument or if desired, any one of the members may include an ear or tab extension, the same being apertured for hook support. As shown in Fig. 1, member 10 includes aperture C.

While herein all graduations of angularity and linear character are illustrated in Figs. 1 and 2 as on but one side of the members, they, if desired, may be provided on opposite sides.

It will be noted in Fig. 1 that the invention is so arranged even in the closed connected form that when the pivot point 17 is moved toward the pivot point 32 and the wind velocity scale is moved so that the pivot 11 moves closer to the pivot 17, that the pivot point 17 may be swung from one side of the ground speed member to the other side thereof without interference.

In Figs. 3 and 4 there is illustrated a modified form of the invention, wherein the accessory features are disclosed.

In said figures, the pivot 11 mounts upon the disc portion 10a of the ground speed member 10, a disc 40. This circular portion 10a includes a logarithmic type scale 41. The disc 40 is smaller and has a corresponding scale 42 at its periphery. Disc 40 may rotate relative to enlargement 10a. Thus, the device constitutes a circular slide rule.

A slightly smaller disc 43 may be mounted on pivot 11. Its peripheral scale 44 is of logarithmic character graduated in hours and minutes. If disc 40 adjacent the edge of disc 43 has a logarithmic scale 45 and reads in miles, the distance travelled can be ascertained by setting the starting point (arrow 50) of scale 44 to register with the average speed in miles per hour on scale 45. The elapsed time reading in the miles per hour scale where it coincides with the miles scale, then gives the distance travelled in miles. This is multiplication. Conversely having given the air line distance in miles between two points and by setting the desired elapsed time reading between those points to coincide and then reading the mile scale where indicated by arrow 50, the average air line speed or ground speed required will be designated in miles per hour. All edges of discs and members may be beveled or chamfered, if desired.

"Sectional" maps of the Civil Aeronautics Authority are made to a common scale. Regional maps of said authority also have a common scale. These scales are not the same. 51 indicates the sectional scales on the lower edges of scales 10 and 16. 52 indicates the regional scale on the opposite and upper edges of member 10. 55 indicates the "inches" rule or scale on member 16.

These members 10 and 16 can be used for a multiplicity of different measuring operations.

The rear faces of disc 30 may have printed, painted, carved, engraved or otherwise formed therein or thereon, certain well known formulae required for aviation purposes and useful for the pilot.

The rear face of members 10 and 30 may have thereon certain data useful to the aviator as indicated at 53 and 54.

As previously described, the air speed scale 16 includes circular disc enlargement 28 coaxial with pivot 17. The zero thereon coincides with the longitudinal axis of slot 20 and is aligned therewith. The scale 29 is graduated and reads from 0° to 180° in opposite directions therefrom. Thus, for either upper or lower position of the wind speed and air speed member, the scale 29 when intersected by slot 24 or its prolongation will read directly the included angle therewith. Thus, the device may be used as a protractor.

From the aforesaid, it is obvious that no calculations on the part of the aviator are required since the device when properly utilized as described herein, automatically indicates the correct answer, or answers, and if the settings are not disturbed, the operation can be readily checked for erroneous use.

Also, the device readily lends itself to use for school work, by civil engineers and contractors, since it includes various scales, et cetera, for such purposes. It is especially useful in the solution of trigonometric problems and in same eliminates the necessity of using or having available a table of trigonometric function values.

For naval aviation purposes, the unit of speed may be knots per hour instead of miles per hour on the three elongated members. Similarly for Continental use, the unit of speed may be kilometers per hour. In such event all other scales would be correspondingly modified, except of course, the angular and logarithmic scales.

The present invention also admirably lends itself to the plane location by radio beam solution, as follows: The pilot knows he is somewhere in the vicinity of a certain location. From one known station having a radio beam of known direction, the observed bearing thereof may be plotted on the chart or map. Similarly, the observed bearing of a second station beam may be plotted in the chart. The intersection of these two bearings is the then present location of the plane on the map and the direction and distance from the certain location can then be ascertained by map observation.

In use, the wind scale member axis would be aligned with the first observed beam direction, the ground speed member axis with the line between the two stations and the air speed scale axis with the second observed beam direction. The intersection of the wind speed and air speed scales axes when placed on the map designates the location of the plane, all without the placing of any lines on the map. For a more complete understanding, of the foregoing, reference is had to page 67 and adajacent pages of Special Publication No. 197, "Practical Air Navigation" by the U. S. Department of Commerce, Coast and Geodetic Survey.

A further use of the invention is as follows:

The pilot inquires of the nearest radio station and ascertains the departure angle from the meridian that the plane message is directed with reference to the meridian at the receiving station. Given this angle by the radio station and the distance from that radio station to another known station and the angle, the pilot may thereupon measure off on the air speed scale the aforesaid distance and arrange it at the proper angle to the ground speed scale and then set the wind speed scale according to the direction angle given by the radio station receiving the pilot's original inquiry. The intersection of the wind speed with the ground speed scale then accurately gives the distance of the plane from the two stations mentioned and whether it is to one side or the other of the same, or in other words, the definite location of the plane and by superimposing the instrument as adjusted upon a map having its scale corresponding to that employed on the instrument, the definite location of the plane with reference to the map can be readily indicated by a single pencil point.

For example, if a plane calls station A and the operator at that station states that the message is 315° from the north and that the angle between the meridian and the line between another known station is 45°, then having given the distance, it will be quite apparent that the included angle between a latitude line and the line between the two stations is 45° and the included angle between the meridian and the radio message direction is 45° or a total of 90°, making a total of the two included angles of the triangle of 135°, leaving the included angle from the plane between the line of the radio message and the line to the second station as of 180° less 135° or 45°.

Another problem readily solvable by the instrument of this invention, by way of example only, is as follows:

If it is assumed that one has an appointment at a definite time at a distant destination, knowing the mileage and the point of departure and destination and knowing the time at which the departure would be started, the distance between that time and the time of the appointment would be the total elapsed time. The total elapsed time applied to the logarithmic scale of it and coordinated with the total distance on the logarithmic distance scale will indicate at time intersection with the logarithmic scale the average ground speed resquired of the plane to meet the appointment.

So far the foregoing is a simple division problem on a logarithmic scale arrangement, commonly called a circular slide rule.

Having given the wind velocity and its direction and having given the direction between the point of departure and the destination point, the wind drift angle member pivot is set on the aforesaid ground speed scale marking and the intersection of that pivot point on the air speed scale as determined by the settings of the wind speed scale and the wind drift angle intersection will give the air speed required of the plane to deliver the plane at the destination at the time designated. By unsnapping wind speed member 21 or air speed member 16 from pin 11 or 32, same may be used as a ruler.

While the invention has been illustated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. In a calculating device peculiarly adapted for aviation calculations, the combination of a compass member, a ground speed elongated member having its zero point coincident with the compass center, said members being relatively rotatable, an elongated air speed member and an elongated wind speed member, the elongated members having a sequential pivotal connection, and a wind correction angle member slidably associated with the ground speed member, and having an angle scale thereon reading oppositely relative to the longitudinal axis of the ground speed member, the longitudinal axis of the air speed member, when the angle scale center registers with the air and ground speed member, axes intersection, intersecting said angle scale for wind correction angle designation and the additive or subtractive character of said correction.

2. In a calculating device peculiarly adapted for aviation calculations, the combination of a compass member, a ground speed elongated member, an elongated air speed member and an elongated wind speed member, the elongated members having sequential pivotal connection, one of said elongated members having its zero point coincident with the compass center, said last mentioned members being relatively rotatable, the wind speed member being pivoted to one of the ground and air speed members at the zero point and having slidable axial connection with the other of said members at the zero point thereof.

3. In a calculating device peculiarly adapted for aviation calculations, the combination of a compass member, a ground speed elongated member having its zero point coincident with the compass center, said members being relatively rotatable, an elongated air speed member and an elongated wind speed member, the elongated members having sequential pivotal connection, a wind correction angle member slidably associated with the ground speed member, and having an angle scale thereon reading oppositely relative to the longitudinal axis of the ground speed member, the longitudinal axis of the air speed member when the angle scale center registers with the air and ground speed member axes intersection, intersecting the angle scale for wind correction angle designation and the additive or substractive character of said correction, and an angular scale arrangement having its center coincident with the intersection of the axes of the wind speed and air speed members and rigid with one of said members, the axis of the other member intersecting said scale and indicating the included angle therebetween.

4. A device as defined by claim 1, characterized by the wind speed member being pivoted to one of the ground and air speed members at the zero point and having axial slidable connection with the other of said members at the zero point thereof.

5. A device as defined by claim 3, characterized by the wind speed member being pivoted to one of the ground and air speed members at the zero point and having axial slidable connection with the other of said members at the zero point thereof.

6. In a calculating device peculiarly adapted for aviation calculations, the combination of a compass member, a ground speed elongated member, an elongated air speed member and an elongated wind speed member, the elongated members having sequential pivotal connection, one of said elongated members having its zero point coincident with the compass center, said last mentioned members being relatively rotatable, each of the elongated members including an elongated slot therein coextensive with the working portion of the scale arrangement on said member, the slot being aligned for zero point intersection of that member by the projection of the slot therein.

7. In a calculating device peculiarly adapted for aviation calculations, the combination of a compass member, a ground speed elongated member, an elongated air speed member and an elongated wind speed member, the elongated members having sequential pivotal connection, and arranged in closed connection arrangement, one of said elongated members having its zero point coincident with the compass center, said last mentioned members being relatively rotatable, and a wind correction angle member slidably associated with the ground speed member, each of the elongated members including an elongated slot therein coextensive with the working portion of the scale arrangement on said member, the slot being aligned for zero point intersection of that member by the projection of the slot therein, and means carried by the wind correction angle member and seatable in the ground speed member slot to prevent relative movement between said angle and ground speed members other than longitudinal slidable movement.

8. In a calculating device peculiarly adapted for aviation calculations, the combination of a compass member, a ground speed elongated member, an elongated air speed member and an elongated wind speed member, the elongated members having sequential and pivotal connection therebetween and arranged in a permanently closed connection arrangement, one of said elongated members having its zero point coincident with the compass center, said last mentioned members being relatively rotatable, and a wind correction angle member slidably associated with the ground speed member.

9. In a calculating device peculiarly adapted for aviation calculations, the combination of a compass member, a ground speed elongated member having its zero point coincident with the compass center, said members being relatively rotatable, an elongated air speed member and an elongated wind speed member, the elongated members having a sequential pivotal connection and arranged in a permanently closed connection arrangement, and a wind correction angle member slidably associated with the ground speed member, and having an angle scale thereon reading oppositely relative to the longitudinal axis of the ground speed member, the longitudinal axis of the air speed member, when the angle scale center registers with the air and ground speed members, axes intersection, intersecting said angle scale for wind correction angle designation and the additive or subtractive character of said correction.

10. A calculating device as defined by claim 3, characterized by the sequential pivotal connection constituting a permanently closed connection arrangement of said elongated members.

11. A calculating device as defined by claim 6, characterized by the sequential pivotal connection constituting a permanently closed connection arrangement of said elongated members.

12. A calculating device as defined by claim 7, characterized by the sequential pivotal connection constituting a permanently closed connection arrangement of said elongated members.

ARNO G. SIEFKER.